United States Patent [19]

McCord et al.

[11] Patent Number: 5,421,094

[45] Date of Patent: Jun. 6, 1995

[54] ADJUSTABLE LEVEL

[76] Inventors: David W. McCord, 13616 "W" St., Omaha, Nebr. 68137; Steven A. Turner, 2798 W. 5450 S., Roy, Utah 84067

[21] Appl. No.: 24,251

[22] Filed: Mar. 1, 1993

[51] Int. Cl.⁶ .............................................. G01C 9/28
[52] U.S. Cl. ..................................... 33/373; 33/371; 33/384; 33/388; 33/390
[58] Field of Search ................. 33/370, 371, 372, 373, 33/383–388, 390

[56] References Cited

U.S. PATENT DOCUMENTS

| | | | |
|---|---|---|---|
| D. 317,725 | 6/1991 | McCord | D10/69 |
| 2,277,071 | 3/1942 | Cassell | 33/388 |
| 2,306,373 | 12/1942 | Belden | 33/370 |
| 2,397,550 | 4/1946 | Kroll | 33/388 |
| 2,452,930 | 11/1948 | Ivey | 33/370 |
| 2,659,975 | 11/1953 | Van Gundy | 33/388 |
| 2,757,458 | 8/1956 | Zipser | 33/388 |
| 3,820,249 | 6/1974 | Stone | 33/390 |
| 4,343,093 | 8/1982 | Eadens | 33/373 |
| 4,970,796 | 11/1990 | Masters et al. | 33/370 |
| 4,976,040 | 12/1990 | Mish et al. | 33/372 |

*Primary Examiner*—Thomas B. Will

[57] ABSTRACT

An adjustable level having an angled base with legs extending normal to one another from a common edge and with magnets spaced along and extending fully through each leg; an L-shaped bracket having at least one bubble housing fixed to a leg thereof; a post extending from the base and through a hole in the bracket; a spring on the post and between a head on the post and the bracket to bias the bracket towards the base and to thereby engage ribs on the bracket into grooves on the base; and a retainer for retaining the level to objects, including a flexible cord connected to a return spring and a loop and hook to secure the cord in a pulled out condition surrounding an object.

2 Claims, 2 Drawing Sheets

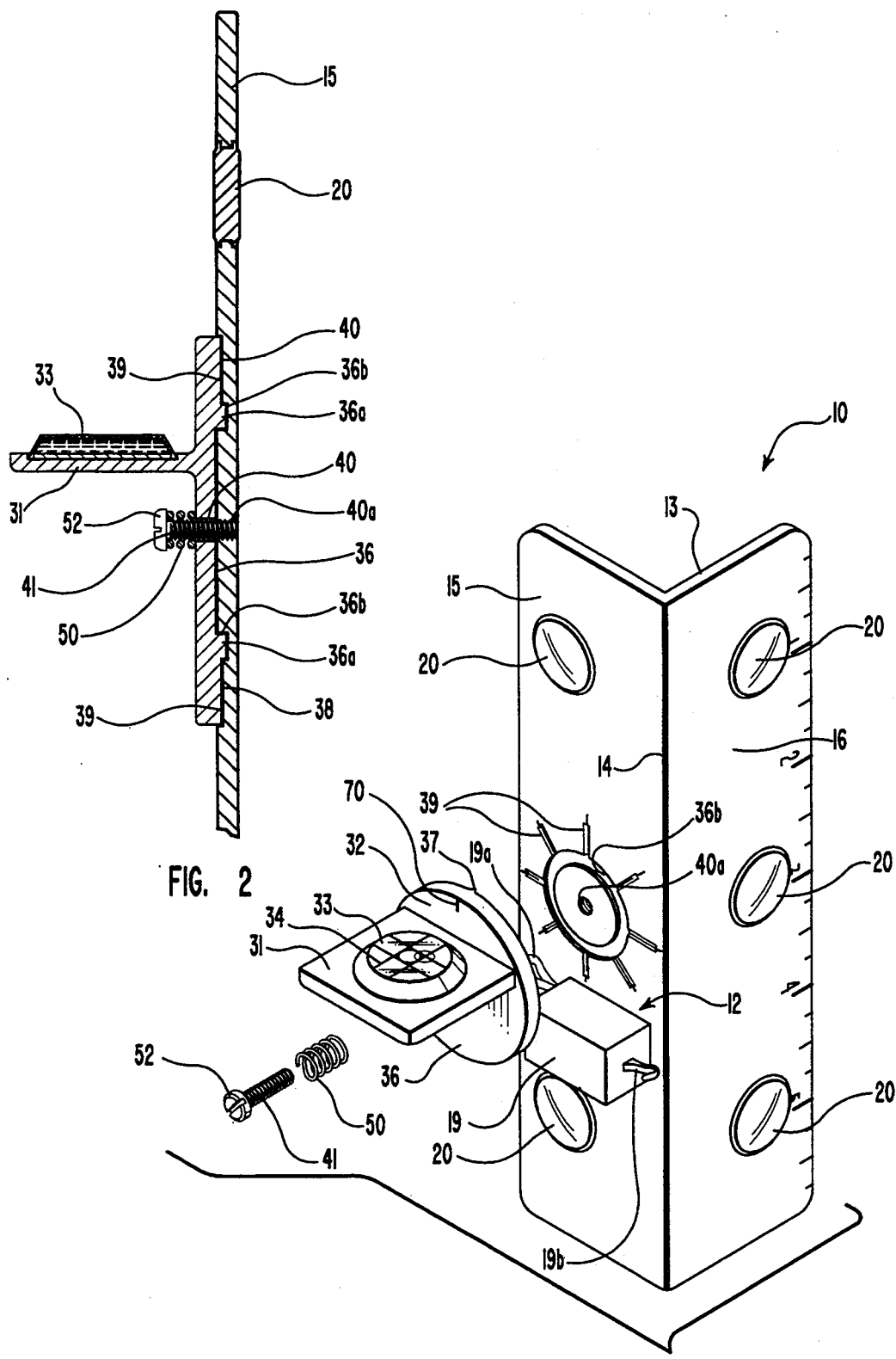

ADJUSTABLE LEVEL

BRIEF DESCRIPTION OF THE INVENTION

Field of the Invention

Levels comprising elongate members with one or more flat surfaces and one or more bubble housing(s) with visible floating bubbles and guide markers to indicate with the bubbles when the flat surface or surfaces are level have long been known and used. Such levels are used for a great variety of purposes and are particularly useful to carpenters, bricklayers, sheet rock installers, fence and siding installers and others in the building trades such as electricians, plumbers, and pipefitters. In fact, such levels are also frequently used by anyone installing or working with pipe, conduit, steel, studs, electrical boxes and appliances.

Many types of levels have been proposed in the past. One such level is shown, for example, in U.S. Pat. Des. No. 317,725. A level, sold under the tradename "LEV-LIT", as early as October 1991, included rubberized magnets attached to the inner surfaces of the legs of an angled base; a bubble housing with a bubble therein adjustably secured to an outer surface of one leg of the angled base; and ruler indicia marked on the outer surface of the other leg of the angled base. A "VELCRO" strap is attached to the angled base for use in securing the "Levlit" to a structure. Locking of the bubble housing with respect to the base is provided using a threaded post projecting from the bubble housing through the leg of the base and a wing nut threaded onto the post.

BRIEF DESCRIPTION OF THE INVENTION

Objects of the Invention

Principal objects of the present invention are to provide an improved adjustable level having an angled base with magnetized legs that will magnetically attach either the inner surfaces or the outer surfaces of the legs to magnetic surfaces, and that has positive locking of the bubble housing at small angular rotations of the bubble housing relative to to the angled base on which the housing is mounted. Another object is to provide an adjustable level wherein angular adjustments betweem bubble housing and base can be made quickly and easily, without diassembly of component parts.

Features of the Invention

Principal features of the invention include a plurality of spaced apart spot magnets spaced along the length of each leg of an angled base; the use of meshing radial members on a leg of the base and on a bubble housing, respectively; together with locking means to lock the bubble housing to the base leg in a pre-set position.

The locking means comprises a mounting post and a spring surrounding the post and biasing a bracket on which the bubble housing is mounted into locking engagement with the base.

Additional objects and features of the invention become apparent to those skilled in the art to which the invention pertains from the following detailed description and claims.

THE DRAWINGS

In the drawings:

FIG. 1 is a perspective view of the adjustable level of the invention mounted to a pole;

FIG. 2, a vertical section view of the adjustable level taken on a line 2—2 of FIG. 1; and FIG. 3, an exploded perspective view.

DETAILED DESCRIPTION

Figure 1:
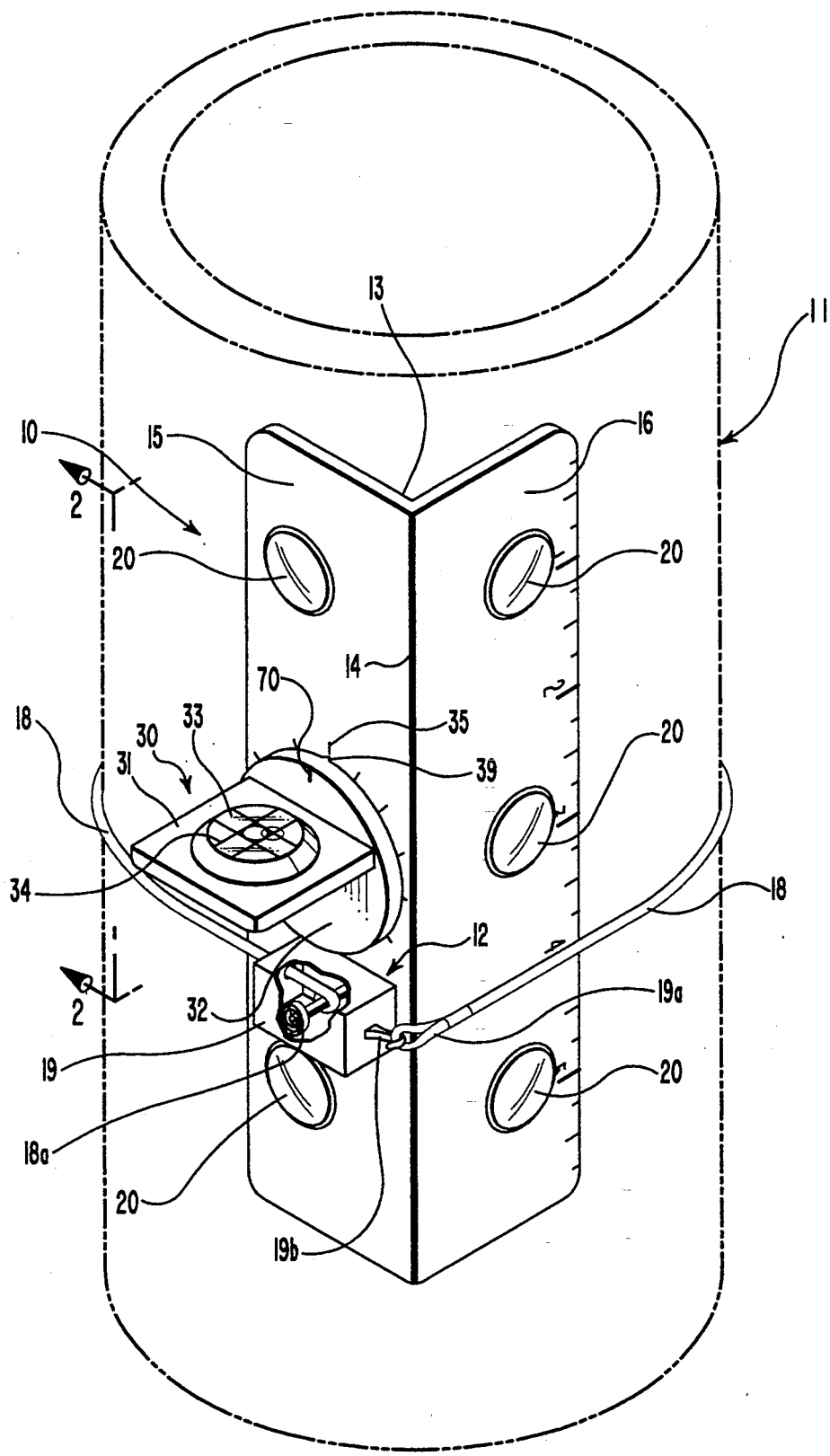

Referring now to the drawings:

In the illustrated preferred embodinent, the adjustable level of the invention, shown generally at 10, is attached to a pole, shown generally at 11, by a retainer 12.

The level includes an angled base 13, having legs 15 and 16 projecting normal to one another from a junction 14. The overall length of the base 13 can be as desired, but generally will not be less than about six inches so that a reliable level measurement can be obtained.

The retainer 12 includes a flexible cord 18 having one end fixed to a coil spring assembly 18a inside a housing 19. The housing 19 is fixed to an outer surface of a leg 15 or 16 of base 13. A loop on the other end of cord 18 engages a hook 19a on the housing 19. The cord 18 is pulled from housing 19, against the bias of the spring assembly 18a, by the loop 19a and is adapted to be passed tightly around a structure, and then to have the the loop 19a connected to the hook 19b. The spring assembly 18a in the housing 19 holds the cable tightly around a structure. The retainer 12 thus allows the level 10 to be securely attached to a structure and to be used even while the user has both hands free, as needed, for purposes other than holding the level.

Spot magnets 20 are inserted into each leg 15 and 16 and are spaced along the length of each leg. As shown, three spot magnets are inserted in each leg, but the number of spot magnets used will depend on the length of the base 13. Each spot magnet extends fully through the leg in which it is inserted and the exposed opposite surfaces of the magnets are flush with the inner and outer surfaces of the legs. The spot magnets 20 are positioned to be close to the outermost edges of the legs in which they are inserted so that they will securely grip round poles or other curved surfaces to which the level 10 may be attached.

A bubble housing 30 is fixed to an outer surface of one leg 31 of an L-shaped bracket 32. The bubble housing is of conventional construction and includes a transparent plastic housing 33 filled with a suitable liquid and with a bubble floating in the liquid. Parallel markings 34 on the housing and degree markings 35 around the periphery of the housing allow a user to determine if a leg 15 or 16 of the level is level or the extent to which such leg is out of level.

The outer surface of the other leg 36 of bracket 32 has a pair of narrow ribs 37 and 38 extending opposite to one another from a hole 40 through the leg. The ribs 37 and are each adapted to fit snugly into one of a series of grooves 39 formed in the outer surface of a leg 15 or The grooves 39 radiate from a central post 41 extending through the hole 40 in leg 36 and each have a length just longer than the length of the ribs 37 and 38. The grooves 39 are equiangularly spaced and the number of grooves 39 provided determines the amount the bubble housing can be turned with respect to the leg 36 between positive locking of the bubble housing 30 to the base The bubble housing 30 is positively locked to the leg 15 when the ribs 37 and 38 are positioned in oppositely extending grooves 39 by a compression spring 50 that fits around the post 41 extending from base 13 through the hole 40 in the leg 36 of the bracket 32. As shown, post 41 is threaded into base 13. Post 41 has a head 52 thereon and the spring 50 fits between the head 52 and leg 36 of the bracket 32 to bias the leg 32 and bubble housing 39 thereon towards the base 13 and the ribs 37 and 38 into grooves 39.

A ring 36a located inside the ribs 37 and 38 fits into a ring circular groove 36b on the leg 15 that is positioned inside the grooves 39 to guide the bracket as it turns with respect to the base.

In practice, the user merely pulls the bracket 32 from the base 13 while compressing the spring 50. The bracket 32 is then rotated about the post 51 until the desired angular relationship between the bubble housing 30 and the base 15 is established. The bracket 32 is released and the spring 50 biases the bracket into locked relationship with the base. The bubble housing is thus positively locked to the base at a desired angle.

An indicator marker 70 on the leg 36 of the bracket 32 aligns with the degree markings provided on the leg 32 of the base to allow a user to set a desired angular relationship between the bracket and the base.

Although a preferred form of our invention has been herein disclosed it is to be understood that the present disclosure is by way of example and that variations are possible without departing from the subject matter coming within the scope of the following claims, which subject matter we regard as our invention.

We claim:

1. An adjustable level comprising
   an angled base having a first leg and a second leg, said legs being connected along a common longitudinal edge;
   a plurality of spot magnets spaced along the length of each base leg and each said magnet extending through said leg to be flush with an inner face and an outer face of said leg;
   retainer means including a flexible cord fixed to said angled base, said retainer means further including a housing fixed to said angled base, spring means in the housing fixed to one end of said flexible cord and winding said cord into said housing, loop means on the other end of said cord and hook means on said housing to engage said loop means when said cord is pulled from said housing;
   an L-shaped bracket having a bubble housing fixed to an outer surface of one leg of said bracket; and
   means on another leg of said bracket and on one leg of said base for adjustably securing said bracket to said base at a selected angular relationship, said means including grooves extending radially and equiangularly from adjacent a central post having one end fixed to and extending from said base, a head on the other end of said post, a plurality of ribs on said other leg of said bracket extending radially from adjacent a central hole through which said post is passed, to fit into said grooves, and a spring surrounding said post between said head on said post and said other leg of said bracket for biasing said bracket to said base.

2. An adjustable level as in claim 1, wherein
   said spot magnets are positioned along an edge of each of said legs remote from the common longitudinal edge of said legs.

* * * * *